(12) United States Patent
Riemers (10) Patent No.: US 8,463,932 B2
(45) Date of Patent: Jun. 11, 2013

(54) FAST HTTP SEEKING

(75) Inventor: Bill C. Riemers, Stoney Creek (CA)

(73) Assignee: Red Hat, Inc., Raleigh, NC (US)

(*) Notice: Subject to any disclaimer, the term of this patent is extended or adjusted under 35 U.S.C. 154(b) by 734 days.

(21) Appl. No.: 12/200,756

(22) Filed: Aug. 28, 2008

(65) Prior Publication Data

US 2010/0057931 A1  Mar. 4, 2010

(51) Int. Cl.
*G06F 15/16* (2006.01)

(52) U.S. Cl.
USPC .......................................... 709/232

(58) Field of Classification Search
USPC .......................................... 709/232
See application file for complete search history.

(56) References Cited

U.S. PATENT DOCUMENTS

| | | | |
|---|---|---|---|
| 7,657,618 B1* | 2/2010 | Rothstein et al. | 709/223 |
| 2003/0005242 A1* | 1/2003 | Dover | 711/158 |
| 2004/0064640 A1* | 4/2004 | Dandrea et al. | 711/114 |
| 2005/0144325 A1* | 6/2005 | Palevich et al. | 709/246 |
| 2007/0033419 A1* | 2/2007 | Kocher et al. | 713/193 |
| 2007/0274340 A1* | 11/2007 | Raveendran et al. | 370/468 |
| 2007/0283079 A1* | 12/2007 | Iwamura et al. | 711/103 |
| 2008/0037420 A1* | 2/2008 | Tang | 370/229 |
| 2008/0072264 A1* | 3/2008 | Crayford | 725/86 |
| 2008/0114894 A1* | 5/2008 | Deshpande | 709/237 |
| 2008/0271095 A1* | 10/2008 | Shafton | 725/87 |
| 2009/0111433 A1* | 4/2009 | Muhonen et al. | 455/414.1 |
| 2009/0123131 A1* | 5/2009 | Morioka | 386/124 |
| 2009/0271577 A1* | 10/2009 | Campana et al. | 711/137 |

OTHER PUBLICATIONS

Vann LeCun, Overview of the DjVu Document Compression Technology, AT&T Labs Research, Middletown, NJ, Apr. 2001 pp. 119-122 (4 pages).

* cited by examiner

*Primary Examiner* — Firmin Backer
*Assistant Examiner* — Jonathan Bui
(74) *Attorney, Agent, or Firm* — Lowenstein Sandler LLP (57) ABSTRACT

An apparatus and a method for requesting data from a server over an HTTP connection. In one embodiment, a client reads a portion of a random access file from the server via the HTTP connection. The client requests for a limited amount of data at another location in the file on the same HTTP connection. The client receives the limited amount of data from the server on the same HTTP connection and reads the limited amount of data. The client requests for an additional limited amount of data at another location in the file on the same HTTP connection. The size of the additional limited amount of data is exponentially greater than the size of the limited amount of data. In another embodiment, the client requests for an additional limited amount of data at another location in the file on the same HTTP connection prior to finishing reading the limited amount of data.

20 Claims, 7 Drawing Sheets

FAST HTTP SEEKING

TECHNICAL FIELD

Embodiments of the present invention relate to computing systems, and more particularly, to requesting data via HTTP from a server.

BACKGROUND

Many video formats such as AVI require random access in files in order to play videos. Unfortunately, there are no abort operation once a request for data from a HTTP server is placed. There are several ways to overcome the lack of abort operation from a HTTP server. In one method, the amount of data to be requested each time is already exactly known. In another method, the entire file is cached. In another method, a new HTTP connection is opened. However, all these operations are fairly slow.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for requesting data from a server over a same HTTP connection. In one embodiment, a client reads a portion of a random access file from the server via the HTTP connection. The client requests for a limited amount of data at another location in the file on the same HTTP connection. The client receives the limited amount of data from the server on the same HTTP connection and reads the limited amount of data. The client requests for an additional limited amount of data at another location in the file on the same HTTP connection. The size of the additional limited amount of data is exponentially greater than the size of the limited amount of data. In another embodiment, the client requests for an additional limited amount of data at another location in the file on the same HTTP connection prior to finishing reading the limited amount of data.

Figure 1:
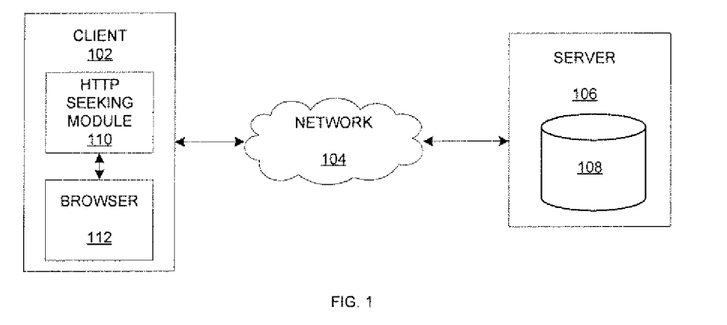
FIG. 1 is a block diagram illustrating one embodiment of a system for requesting data from a server over a same HTTP connection.

FIG. 1 is a block diagram illustrating one embodiment of a system for requesting data from a HTTP server. A client 102 accesses data from storage 108 of server 106 via a computer network 104 such as the Internet. The data being accesses may require a random access in a file. For example, the data may include a video having a video format such as AVI which requires random access in the file in order to play videos.

Client 102 includes an application, such as a media player or a web browser 112, configured to access the data. Unfortunately, once a request for the data to the server is placed, HTTP specifies no abort operation. In one embodiment, this can be overcome by requesting small amounts of data. It is generally faster to read a small amount of data and make the next request on the same connection. One way to accomplish this is to make each request for only a small block of data. When that data is consumed, the client requests the next block of data. If it is desired to seek within the data already requested the client just reads to the start of that data. If it is desired to seek beyond the data requested, then the client simply read to the end of the current request and make the next request at the location desired.

Unfortunately, consistently requesting small blocks of data will slow down overall throughput if done synchronously. To solve this problem, a HTTP seeking module 110 is connected to the browser 112. The HTTP seeking module 110 varies the size of the request from browser 112 to server 106. For example, the first request after a seek is performed for a small amount of data (e.g. 8 kb). Then, each of the following requests is performed for an exponentially increase amount of data. So the cost of the next seek operation goes up, but so does throughout. If browser 112 is not seeking very often, then seek speed is less important than when reading small amounts of data and seeking frequently. The operation of HTTP seeking module 110 is described in more detail below.

Figure 2:
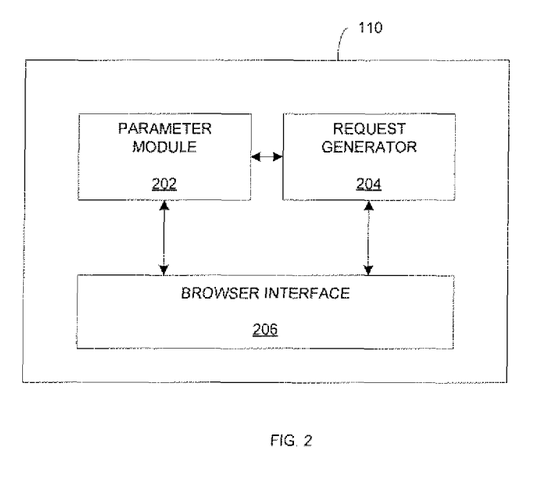
FIG. 2 is a block diagram illustrating one embodiment of a HTTP seeking module.

FIG. 2 is a block diagram illustrating one embodiment of a HTTP seeking module 110. HTTP seeking module 110 includes a parameter module 202, a request generator 204, an application interface, such as a web browser interface 206. The parameter module 202 includes several parameters to be considered when generating the request for data. The parameters may include a minimum request size, a growth rate, a maximum number of bytes, and a maximum request size. The minimum request size is used immediately after a seek or when opening the file. One embodiment of the growth rate is to double the request size each time. The maximum number of bytes is the maximum number of bytes willing to read instead of closing the connection and opening a new one. The maximum request size includes the maximum request size that a user of the browser is willing to use.

Request generator 204 is configured to generates a seeking request in accordance with the parameters of parameter module 202. An operation of the request generator 204 is described in more detail with respect to FIGS. 3 and 4. The generated seeking request is then forwarded to browser interface 206 which communicate with browser 112.

Figure 3:
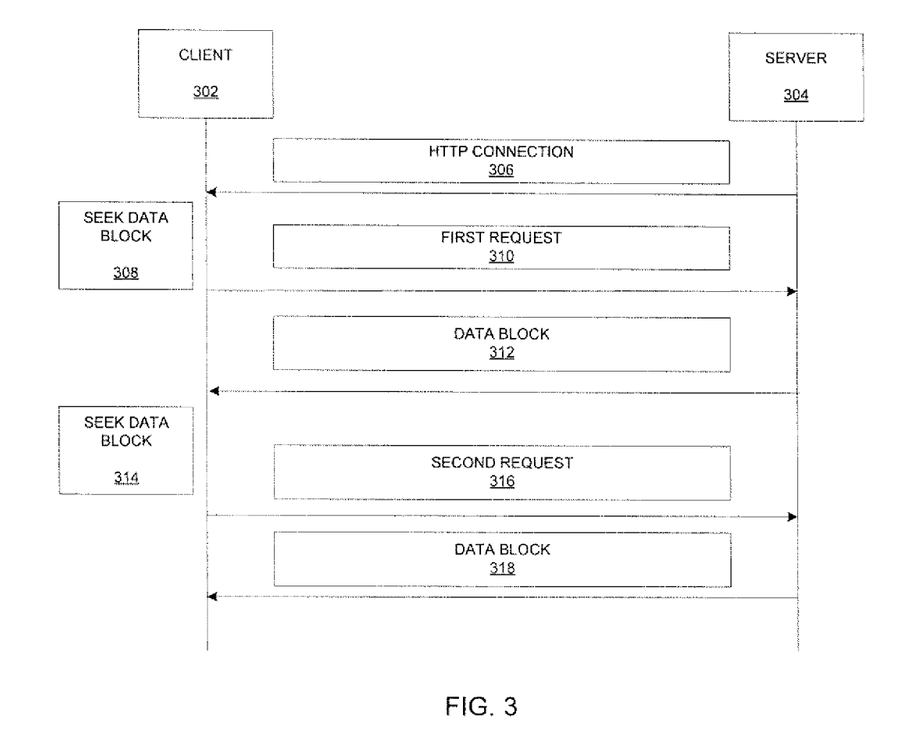
FIG. 3 is a ladder diagram illustrating one embodiment of a communication between a client and a server over a same HTTP connection.

FIG. 3 is a ladder diagram illustrating one embodiment of a communication between a client 302 and a server 304. Client 302 opens an HTTP connection 306 with server 304 to access data from server 304. In one embodiment, the data includes files that require random access to different parts of the files, such as audio and/or video files. Client reads the data and at 308 seeks a data block in the file. Client then generates a first request to seek and sends the first request 310 to server 304. First request 310 may include a request for a block of data of a small limited size such as 8 kb. Server 304 generates a response and sends the data block 312 in response to the first request 310.

Client generates a second request to seek and sends the second request 316 to server 304. Second request 316 may include a request for a block of data of a larger size than the size of the first request. In one embodiment, the second and subsequent requests exponentially increase in block of data size. Server 304 generates a response and sends data block 318 in response to the second request 316.

Figure 4:
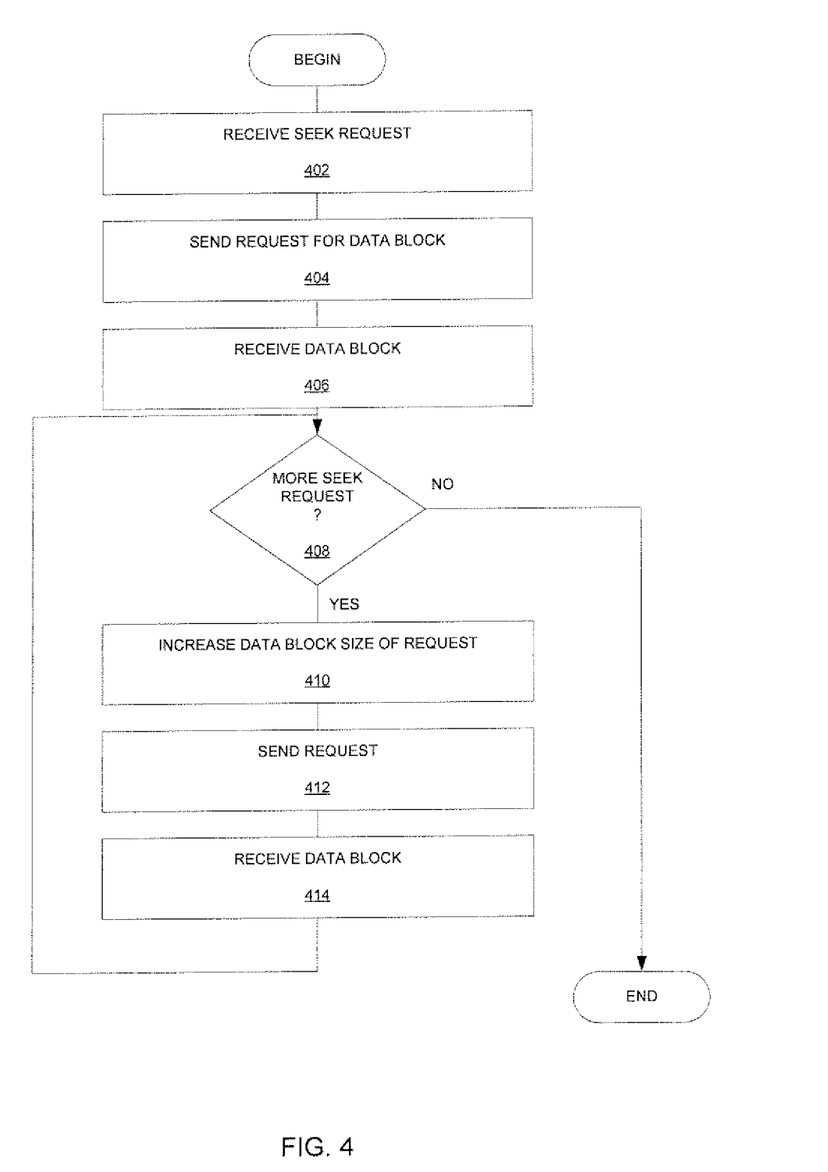
FIG. 4 is a flow diagram illustrating one embodiment of a method for requesting data from a server over a same HTTP connection.

FIG. 4 is a flow diagram illustrating one embodiment of a method for requesting data from a server over a same HTTP connection. At 402, a client receives a seek request from a user accessing a file. The file includes a video and/or audio file. At 404, the client sends a request for a data block of a small size to the server over the same HTTP connection. At 406, the client receives the data block in response to the request. At 408, client determines whether another seek operation on the file is requested. If the client detects that another seek operation is requested, client increases the data block size of the request at 410, sends the new request to the server at 412 over the same HTTP connection. The client receives the newly requested data block at 414.

Figure 5:
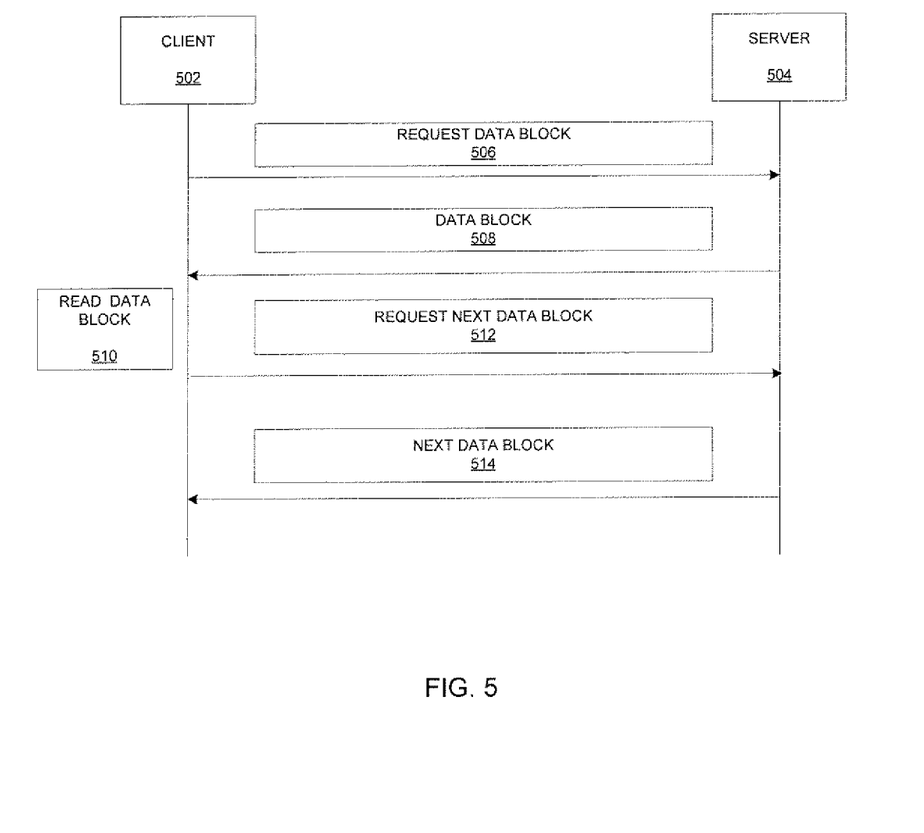
FIG. 5 is a ladder diagram illustrating another embodiment of a communication between a client and a server over a same HTTP connection.

FIG. 5 is a ladder diagram illustrating another embodiment of a fast asynchronous communication between a client and a server over the same HTTP connection. A client 502 generates and sends a request for a data block from server 504 over the same HTTP connection. The server 504 returns the requested data block 508. Client 502 receives and reads the data block at 510. However, prior to finishing reading the data block 508, client 502 generates and sends another request for a data block 512. In one embodiment, the block data size of subsequent requests is the same as the initial block data size of the initial requests.

However, because all prior requested data are queued, when a seek is performed, all prior requested data need to be read. For this reason, this alternative embodiment includes tuning the size of the data requests to a minimum size which will still give adequate throughput. This could be done either dynamically by measuring data transmission rates, or statistically with parameters which seem to work well for most connection. In accordance with another embodiment, previous requests can be cached to avoid requests.

Figure 6:
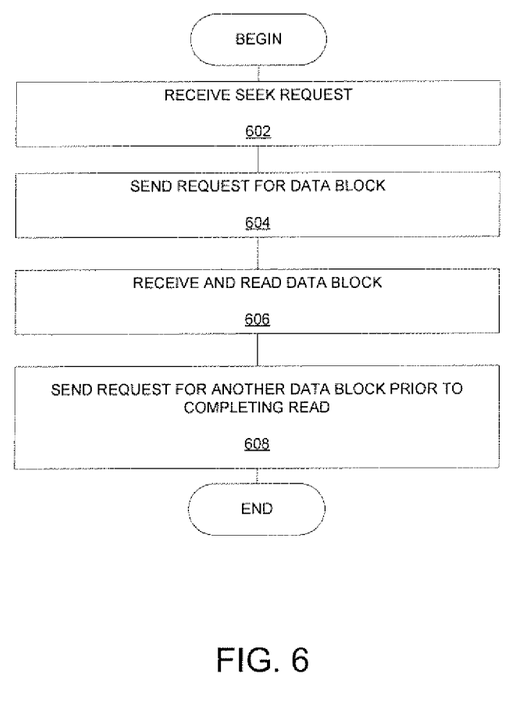
FIG. 6 is a flow diagram illustrating another embodiment of a method for requesting data from a server over a same HTTP connection.

FIG. 6 is a flow diagram illustrating another embodiment of a method for requesting data from a server over a same HTTP connection. At 602, a client receives a seek request from a user accessing a file. The file includes a video and/or audio file. At 604, the client sends a request for a data block of a small size to the server over the same HTTP connection. At 606, the client receives the data block in response to the request. At 608, client 608 sends a new request to the server at 412 over the same HTTP connection prior to finishing reading the data block received in response to the initial request.

Figure 7:
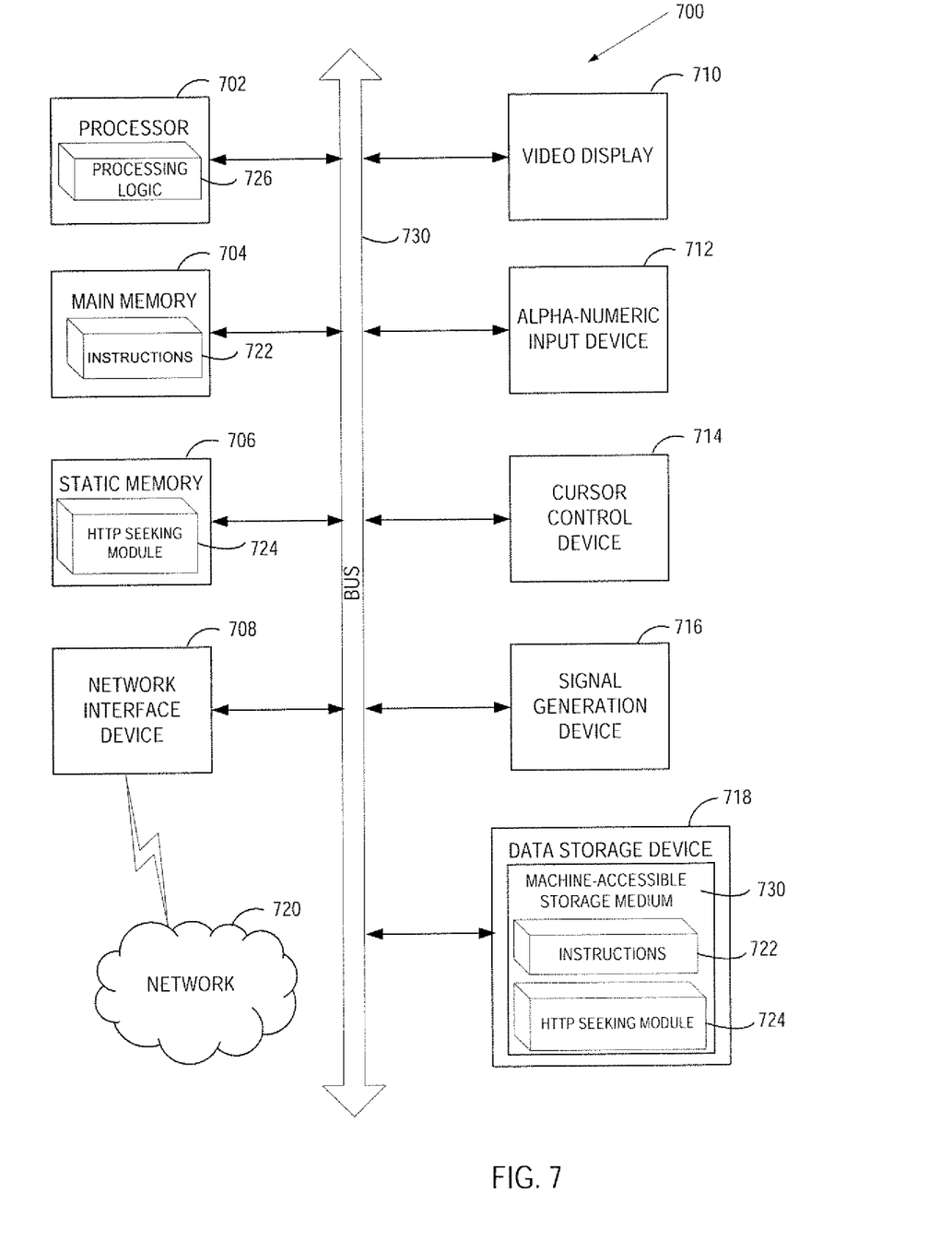
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store the HTTP seeking module 724 as presently described. The HTTP seeking module 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    reading, by a client device, at least a portion of a random access file from a server via an HTTP connection;
    in response to reading the at least a portion of the random access file, requesting, by the client device via the HTTP connection, a first amount of data at a first location in the random access file;
    receiving, by the client device via the HTTP connection, the first amount of data from the server;
    reading, by the client device, the first amount of data;
    determining, by the client device, a second amount of data to be requested, the determining based on a minimum size request parameter, a growth rate parameter, a maximum number of bytes parameter, and a maximum request size; and
    prior to completing the reading of the first amount of data received from the server, requesting, by the client device via the HTTP connection, the second amount of data at a second location in the random access file that is different than the first location, wherein the size of the second amount of data being requested is greater than the size of the first amount of data.

2. The computer-implemented method of claim 1 further comprising:
    increasing the size of subsequent requests for further amounts of data at other locations in the file.

3. The computer-implemented method of claim 1 wherein the size of the second amount of data is exponentially greater than the size of the first amount of data.

4. The computer-implemented method of claim 2 wherein the subsequent requests for the further amounts of data are also based on the minimum size request parameter, the growth rate parameter, the maximum number of bytes parameter, and the maximum request size.

5. The computer-implemented method of claim 2 further comprising:
    sending the subsequent requests for the further amounts of data at the other locations in the file on the HTTP connection prior to finishing reading the second amount of data.

6. The computer-implemented method of claim 1 further comprising:
    tuning the size of the second amount of data to a minimum size.

7. The computer-implemented method of claim 1 further comprising:
    caching the request for the additional limited second amount of data.

8. The computer-implemented method of claim 1 wherein the size of the first amount of data is less than 8 kb.

9. A client comprising:
    a memory;
    a processing device communicably coupled to the memory;
    an application executable from the memory by the processing device, wherein the application is to read at least a portion of a random access file from a server via an HTTP connection; and
    an HTTP seeking module executable from the memory by the processing device and communicable coupled to the application, wherein the HTTP seeking module is to:
        request, via the HTTP connection, a first amount of data at another location in the random access file in response to reading the at least a portion of the random access file;
        receive, via the HTTP connection, the first amount of data from the server;
        read the first amount of data;
        determine a second amount of data to be requested, the determining based on a minimum size request parameter, a growth rate parameter, a maximum number of bytes parameter, and a maximum request size; and request, via the HTTP connection, prior to completing the reading of the first amount of data received from the server, the second amount of data at a second location in the random access file that is different than the first location, wherein the size of the second amount of data being requested is greater than the size of the first amount of data.

10. The client of claim 9 wherein the HTTP seeking module is further to increase the size of subsequent requests for further amounts of data at other locations in the file.

11. The client of claim 9 wherein the size of the second amount of data is exponentially greater than the size of the first amount of data.

12. The client of claim 10 wherein the subsequent requests for the further amounts of data are also based on the minimum size request parameter, the growth rate parameter, the maximum number of bytes parameter, and the maximum request size.

13. The client of claim 9 wherein the HTTP seeking module is further to send the subsequent requests for the further amounts of data at the other locations in the file on the HTTP connection prior to finishing reading the second amount of data.

14. The client of claim 9 wherein the HTTP seeking module is further to tune the size of the second amount of data to a minimum size.

15. The client of claim 9 wherein the HTTP seeking module is further to cache the request for the second amount of data.

16. The client of claim 9 wherein the size of the first amount of data is less than 8 kb.

17. A non-transitory computer-readable medium containing data and instructions to cause a processing device to perform operations comprising:

reading, by the processing device, at least a portion of a random access file from a server via an HTTP connection;

in response to reading the at least a portion of the random access file, requesting, by the processing device via the HTTP connection, a first amount of data at a first location in the random access file;

receiving, by the processing device via the HTTP connection, the first amount of data from the server;

reading, by the processing device, the first amount of data;

determining, by the processing device, a second amount of data to be requested, the determining based on a minimum size request parameter, a growth rate parameter, a maximum number of bytes parameter, and a maximum request size; and prior to completing the reading of the limited first amount of data received from the server, requesting, by the processing device via the HTTP connection, the second amount of data at a second location in the random access file that is different than the first location, wherein the size of the second amount of data being requested is greater than the size of the first amount of data.

18. The non-transitory computer-readable medium of claim 17 wherein the operations further comprise:

increasing the size of subsequent requests for further amounts of data at other locations in the file.

19. The non-transitory computer-readable medium of claim 17 wherein the size of the second amount of data is exponentially greater than the size of the first amount of data.

20. The non-transitory computer-readable medium of claim 17 wherein the operations further comprise:

sending the subsequent requests for the further amounts of data at the other locations in the file on the HTTP connection prior to finishing reading the second amount of data.

* * * * *